United States Patent [19]
Rupprecht et al.

[11] Patent Number: 5,136,772
[45] Date of Patent: Aug. 11, 1992

[54] PROCESS FOR THE MANUFACTURE OF A TWO-PART OPERATING PISTON FOR A DISC BRAKE

[75] Inventors: Bernd Rupprecht, Edingen-Neckarhaussen; Paul Antony, Bürstadt, both of Fed. Rep. of Germany

[73] Assignee: Deutsche Perrot-Bremse GmbH, Mannheim, Fed. Rep. of Germany

[21] Appl. No.: 645,976

[22] Filed: Jan. 24, 1991

[30] Foreign Application Priority Data

Jan. 24, 1990 [DE] Fed. Rep. of Germany ....... 4002019

[51] Int. Cl.$^5$ .................... B21D 39/00; B23P 11/00
[52] U.S. Cl. .................... 29/511; 29/509; 29/515
[58] Field of Search .............. 29/509, 511, 515, 516, 29/517, 437

[56] References Cited

U.S. PATENT DOCUMENTS

| 2,537,723 | 1/1951 | Ward | 29/511 |
| 2,840,113 | 6/1958 | Simpson et al. | 29/511 X |
| 3,007,603 | 11/1961 | Krehl | 29/511 |
| 3,090,114 | 5/1963 | Sinclair | 29/511 X |
| 3,253,330 | 5/1966 | Davies | 29/511 X |
| 4,722,619 | 2/1988 | Reiser et al. | 29/515 X |
| 4,848,448 | 7/1989 | Kaarre | 29/511 X |

FOREIGN PATENT DOCUMENTS

| 0042156 | 12/1981 | European Pat. Off. | |
| 2388636 | 12/1978 | France | 29/511 |

*Primary Examiner*—Timothy V. Eley
*Assistant Examiner*—C. Richard Martin
*Attorney, Agent, or Firm*—Fleit, Jacobson, Cohn, Price, Holman & Stern

[57] ABSTRACT

A process of permanently joining a cylindrical core (2) to a metallic beaker-shaped part (1) which together form an operating piston of a hydraulically operated disc brake includes inserting the core into a bore in the beaker-shaped part, and providing an axially protruding end on the core beyond the annular end surface (7) of the beaker-shaped part having a conical surface (8) extending from its free surface (6) into the front area of the beaker-shaped part (1). A wedge-shaped annular groove (11) is produced in the beaker-shaped part (1), whereby material is radially displaced inwardly so that it abuts against the conical surface (8) of the core to retain the core in the beaker-shaped part.

1 Claim, 1 Drawing Sheet

PROCESS FOR THE MANUFACTURE OF A TWO-PART OPERATING PISTON FOR A DISC BRAKE

BACKGROUND OF THE INVENTION

The invention relates to a process for the permanent joining of a cylindrical core of a heat-insulating material to a beaker-shaped part of metal, which together form the operating piston of a hydraulically operated disc brake, wherein the core is inserted into the beaker-shaped part and the beaker-shaped part is then plastically deformed in the area of its annular surface, whereby metal is displaced inwardly so that it extends over the core.

It is the object of two-part operating pistons of this type to prevent the leakage of heat, which is produced during the braking by way of friction, to the hydraulic medium acting on the pistons. For safety reasons, the temperature of the hydraulic medium must never exceed 120° C., otherwise vapor bubbles develop and substantially restrict the functional capability of the brake.

Various types of joinings of a core of heat-insulating material to a metal beaker-shaped part of a brake piston can be divided into three main groups:
1: Permanent joining
2: Releasable joining
Disadvantages of 1 and 2 are:
complicated piston geometry;
small individual parts, placement, and manufacturing tolerances;
many individual parts;
large stock of spare parts;
complicated and expensive assembly, dismantling and repair.

Adhesive joining can also be considered for a permanent joint, however, present day technical possibilities include the danger of separation due to different heat-expansion coefficients and with the development of dynamic loads. Furthermore, the technical effort for producing an adhesive joint is large.

3: Loose joining
Disadvantages of 3 are:
complicated piston geometry;
small placement and manufacturing tolerances;
different wear parameters (metal/synthetic material).

Joinings according to 2 and 3 may also result in destruction due to different piston materials if dynamic loads develop during a braking process. This can occur either by disc warpage or by brake application when brake forces, which are effective in the peripheral direction of the brake disc, force the shell surface of the cylindrical core against the abutment surface of the beaker-shaped metal part.

A method of the earlier described type is described in European Patent Document EP-0 042 156 A1. No statement is made in this document regarding the fitting of the cylindrical core and its receiving bore in the beaker-shaped part. After inserting the core into the beaker-shaped part, its annular surface protrudes axially over the end surface of the core. The protruding area of the beaker-shaped part is then flanged radially inwardly, thus forming a lip which reaches over the face surface of the core. An additional metal disc, which abuts against the face surface of the core and is permanently connected thereto, is provided in order to avoid contact of the flanged lip with the brake shoe. For this reason, the metal disc is provided at its rear side with a hollow hub, which is inserted into a concentric bore in the core of a heat-insulating material and then radially spread in its protruding area. Obviously, the manufacture of this known brake piston is relatively expensive. Consequently, necessary repairwork is rather expensive if the complete brake piston has to be exchanged.

BRIEF SUMMARY OF THE INVENTION

It is the object of the invention to provide an improved method which overcomes the above disadvantages of the prior art and reduces the production costs of the brake piston.

The object is achieved in this invention which provides a method for better cost-effective production of a heat-insulating brake piston, as it consists of only two parts with a small intermediate clearance between these two parts allowing for their different heat-expansion coefficients.

BRIEF DESCRIPTION OF THE DRAWINGS

A preferred embodiment of the invention will now be described in detail below with reference to the accompanying drawings wherein.

DETAILED DESCRIPTION

Figure 1:
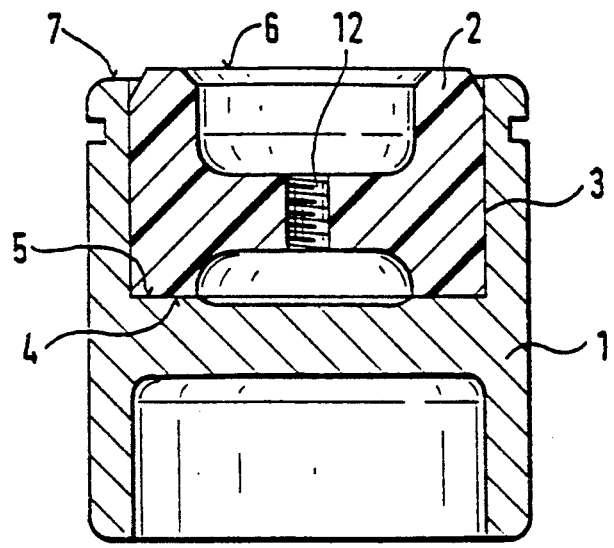
FIG. 1 is an axial cross-sectional view of a two part brake piston prior to permanently joining these two parts.
Figure 2:
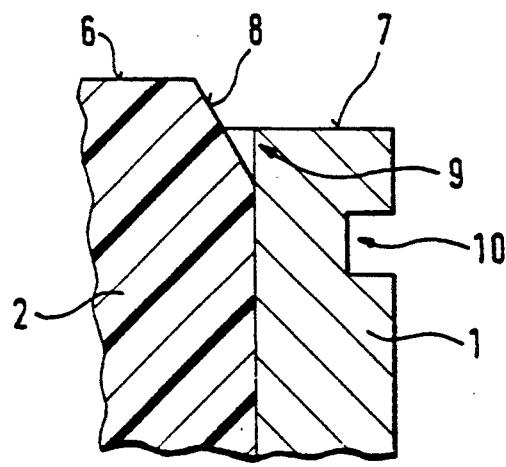
FIG. 2 is an enlarged cross-sectional view of a part of FIG. 1 prior to permanently joining the parts of the brake piston.

In FIG. 1 is illustrated in axial cross-section a two-part operating piston of a hydraulically operated disc brake. The operating piston consists of a beaker-shaped part 1 having a bore therein and a cylindrical core 2 inserted into the bore with a small intermediate clearance 3. The beaker-shaped part 1, which in the built-in or operating state of the operating piston is loaded by the hydraulic medium, is made of metal, for example iron, and the core 2, which supports the brake shoe (not illustrated), is made of a heat-insulating material, for example, synthetic material or ceramics. When inserting the core 2 into the breaker-shaped part 1, the clearance 3 allows the escape of air trapped between these parts, so that a special air-outlet aperture is not really required. Furthermore, the clearance 3 allows for the different heat-expansion coefficients of the materials of the breaker-shaped part 1 and core 2.

The arrangement of core 2 with its hollow spaces is variable and depends on the different occurring brake temperatures.

The cylindrical core 2 rests with its rear end surface 5, which faces away from the brake disc, on the cylinder, or bore, bottom 4 of the beaker-shaped part 1, and its front or outer end surface 6, which faces towards the brake disc, protrudes axially over the annular surface 7 of the beaker-shaped part 1. The cylindrical core 2 has a conical, or frustoconical portion, or area, 8, which extends from its front end surface 6 to the inside of the bore at the front, or outer end portion 9 of the beaker-shaped part 1.

In the embodiment shown, the cylindrical core 2 is provided with a concentric threaded bore 12, permitting the attachment of additional heat-damping media, for example as disclosed in German Patent Document DE 36 41 181 A1.

The beaker-shaped part 1 is provided with a circumferential groove 10 for securing a sealing cuff (not illustrated).

Figure 3:
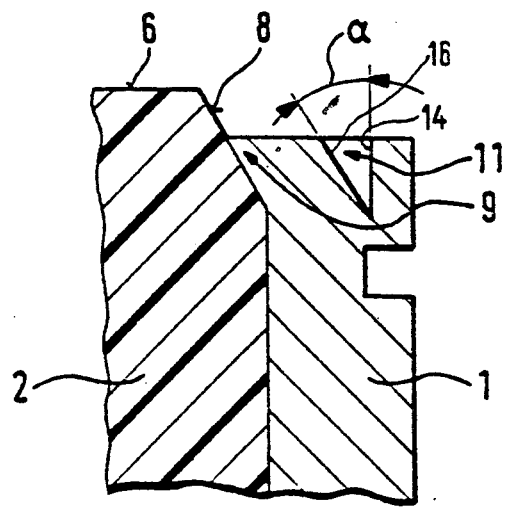
FIG. 3 is a view similar to FIG. 2, but after permanently joining the two parts of the brake piston.

After the insertion of core 2 into the beaker-shaped part 1, an annular groove 11 is produced in the annular surface 7 of the beaker-shaped part 1 by means of a roller or pressure tool (not illustrated). As shown in FIG. 3, this annular groove 11 is of wedge-shaped cross-section with the radially outer flank or surface 14 being parallel with the axis of the beaker-shaped part 1, and the radially inner flank or surface 16 being parallel with the frustoconical surface 8 of core 2. Thus, angle α enclosed by the two flanks of the annular groove 11 corresponds to the conical angle of the frustoconical surface 8 of core 2. When producing annular groove 11, a plastic deformation of the material of beaker-shaped part 1 takes place, so that it is displaced radially inwardly until abutting against frustoconical surface 8 of core 2. These two parts are thus permanently joined as the radially inwardly displaced material of the outer end portion 9 of beaker-shaped part 1 extends over the peripheral surface of core 2.

For producing the annular groove 11, the use of a roller tool with asymmetric cone-shaped cross section is preferred.

Although the embodiment as illustrated in the drawing and described above is a preferred embodiment, numerous variations are possible within the framework of general subject knowledge without departing from the basic idea of the invention. For example, the plastic deformation of part of the annular outer end 9 of beaker-shaped part 1 to radially displace material thereof over area 8 of core 2 can be accomplished by forming a plurality of circumferentially spaced, or offset, wedge-shaped recesses 11 by a pressure tool designed therefor.

We claim:

1. A process for permanently joining a cylindrical core of a heat-insulating material to a metallic beaker-shaped part having a central axis, an outer end portion, an annular outer end surface on the outer end portion and a bore therein with an outer open and for receiving the core to form an operating piston of a hydraulically operated disc brake, comprising:

inserting the core axially into the bore of the beaker-shaped part and providing a small clearance between the bore and the outer cylindrical surface of said core;

providing out outer end portion on said core protruding axially outwardly beyond the annular outer end surface of the beaker-shaped part and having an outer end surface thereon;

providing a frustoconical surface on said outer end portion of the core extending from a position on said outer end surface on sia core radially inwardly of the outer cylindrical surface thereof to the outer cylindrical surface proximal said outer end portion on the beaker-shaped part; and plastically deforming part of said outer end portion of the beaker-shaped part radially inwardly into engagement with said frustoconical surface by applying to said annular outer end surface a rotating pressure tool having an asymmetric wedge-shaped cross section thereby forming at least one wedge-shaped recess in said annular outer end surface having a radially inner flank extending substantially parallel to said frustoconical surface and a radially outer flank extending substantially parallel with the central axis of the beaker-shaped part.

* * * * *